US008904198B1

(12) United States Patent
Pinto et al.

(10) Patent No.: US 8,904,198 B1
(45) Date of Patent: Dec. 2, 2014

(54) ELECTRICAL DEVICE RECHARGING KIOSK ASSEMBLY

(76) Inventors: Adriano L. Pinto, Brockton, MA (US); Kenelly J. Cineus, Brockton, MA (US)

( * ) Notice: Subject to any disclaimer, the term of this patent is extended or adjusted under 35 U.S.C. 154(b) by 903 days.

(21) Appl. No.: 13/086,188

(22) Filed: Apr. 13, 2011

(51) Int. Cl.
*G06F 1/26* (2006.01)
*G06F 1/32* (2006.01)

(52) U.S. Cl.
USPC ............. 713/300; 713/310; 713/340; 705/77; 455/572; 455/573

(58) Field of Classification Search
CPC ... G06F 1/1632; G06F 11/3063; H04L 12/14; H04L 12/1403; H04L 12/1467
USPC ............. 713/300, 310, 340; 705/77; 455/272, 455/273
See application file for complete search history.

(56) References Cited

U.S. PATENT DOCUMENTS

| | | | | |
|---|---|---|---|---|
| 4,184,580 | A | 1/1980 | Ellis, Jr. | |
| 5,423,407 | A | 6/1995 | Nikolic | |
| 5,631,536 | A | 5/1997 | Tseng | |
| 5,744,933 | A | 4/1998 | Inoue et al. | |
| D445,458 | S | 7/2001 | Tomioka | |
| 2003/0141840 | A1 | 7/2003 | Sanders | |
| 2005/0104555 | A1 | 5/2005 | Simmonds-Short | |
| 2011/0001457 | A1 * | 1/2011 | Mueller | 320/136 |

* cited by examiner

*Primary Examiner* — Michael J Brown

(57) ABSTRACT

A electrical device recharging kiosk assembly includes a housing that has a top wall, a bottom wall and a perimeter wall attached to and extending between the top and bottom walls. The housing has a plurality of storage spaces therein for holding an electronic device. Each of the storage spaces includes an opening extending through the perimeter wall, a compartment aligned with and accessible through the opening, a door for closing the opening to the compartment, and a lock to lock the door. A charging implement for recharging a battery of the electronic device is positioned within the compartment. A control is mounted on the housing and is electrically coupled to the lock of each of the storage spaces. The control unlocks a door of one of the storage spaces to allow access to a selected one of the storage spaces and to the charging implement positioned therein.

9 Claims, 7 Drawing Sheets

ELECTRICAL DEVICE RECHARGING KIOSK ASSEMBLY

BACKGROUND OF THE DISCLOSURE

Field of the Disclosure

The disclosure relates to electrical device chargers and more particularly pertains to a new electrical device charger for allowing a person to pay to have the battery of their electronic device charged in a kiosk type device.

SUMMARY OF THE DISCLOSURE

An embodiment of the disclosure meets the needs presented above by generally comprising a housing that has a top wall, a bottom wall and a perimeter wall attached to and extending between the top and bottom walls. The housing has a plurality of storage spaces therein for holding an electronic device. Each of the storage spaces includes an opening extending through the perimeter wall. A compartment is mounted within the housing and is aligned with and accessible through the opening. A door is mounted on the perimeter wall and is positioned in a closed position covering the opening or in an open position exposing the opening. A lock is engageable with the door and configured to lock the door in the closed position. A charging implement configured to recharge a battery of the electronic device is positioned within the compartment. A control is mounted on the housing and is electrically coupled to the lock of each of the storage spaces. The control unlocks a door of one of the storage spaces to allow access to a selected one of the storage spaces and to the charging implement positioned therein.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
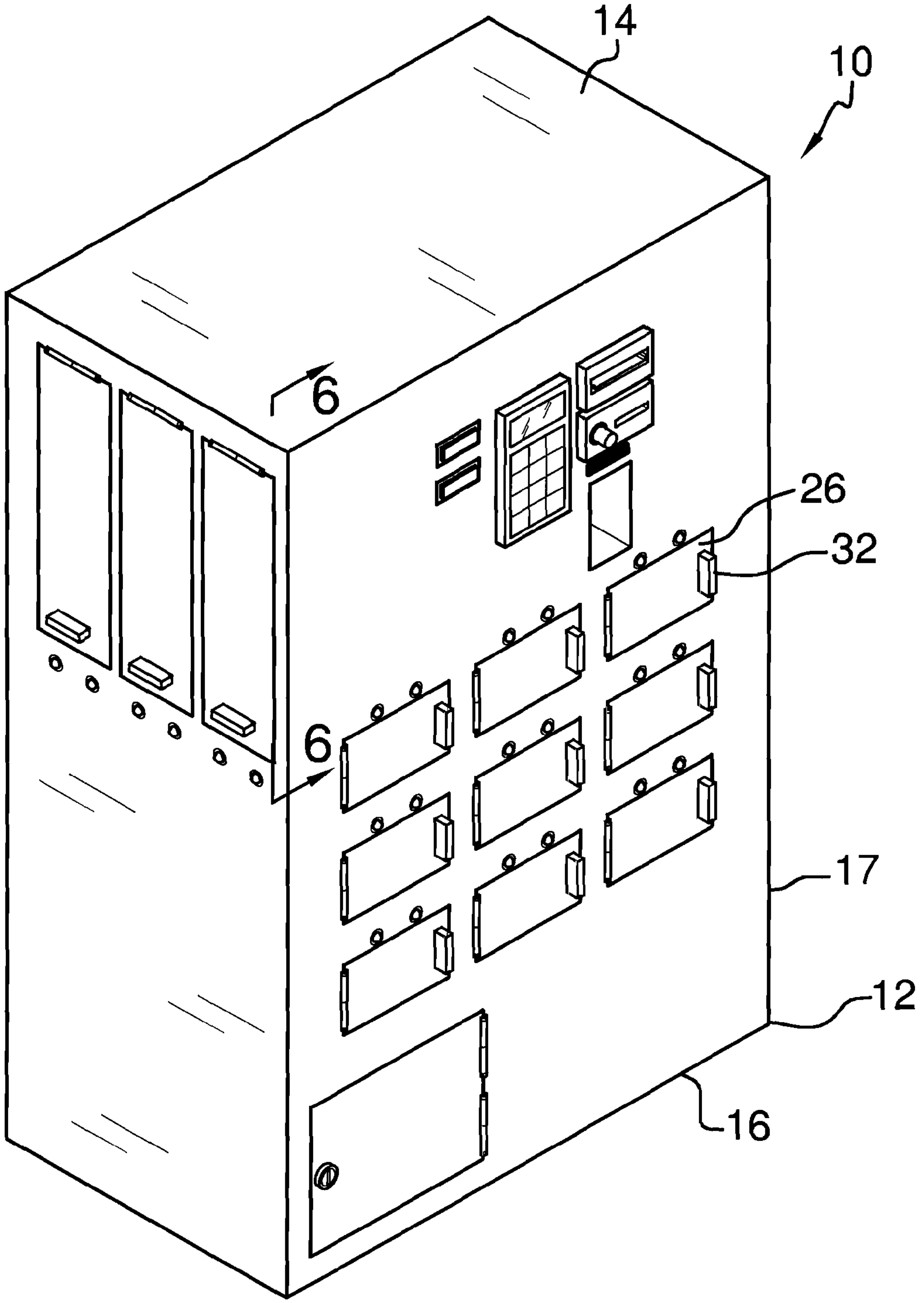
FIG. 1 is a front perspective view of a electrical device recharging kiosk assembly according to an embodiment of the disclosure.
Figure 2:
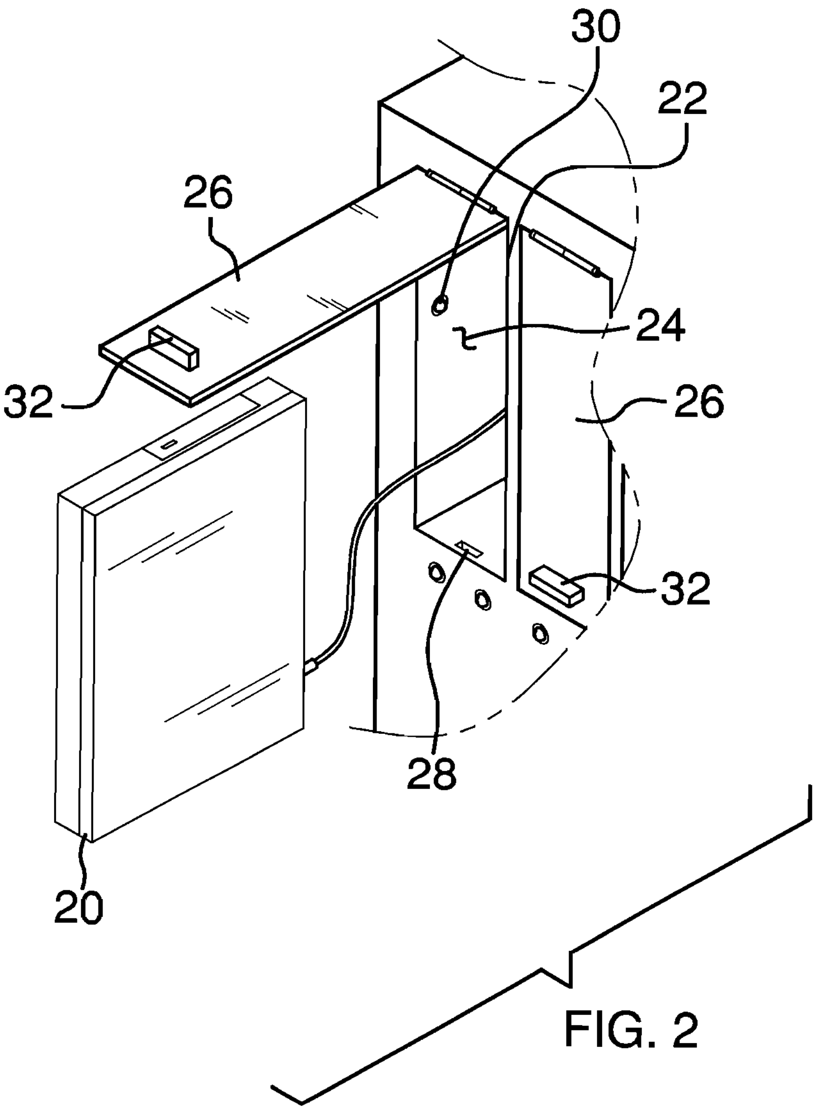
FIG. 2 is a broken side perspective view of an embodiment of the disclosure.
Figure 3:
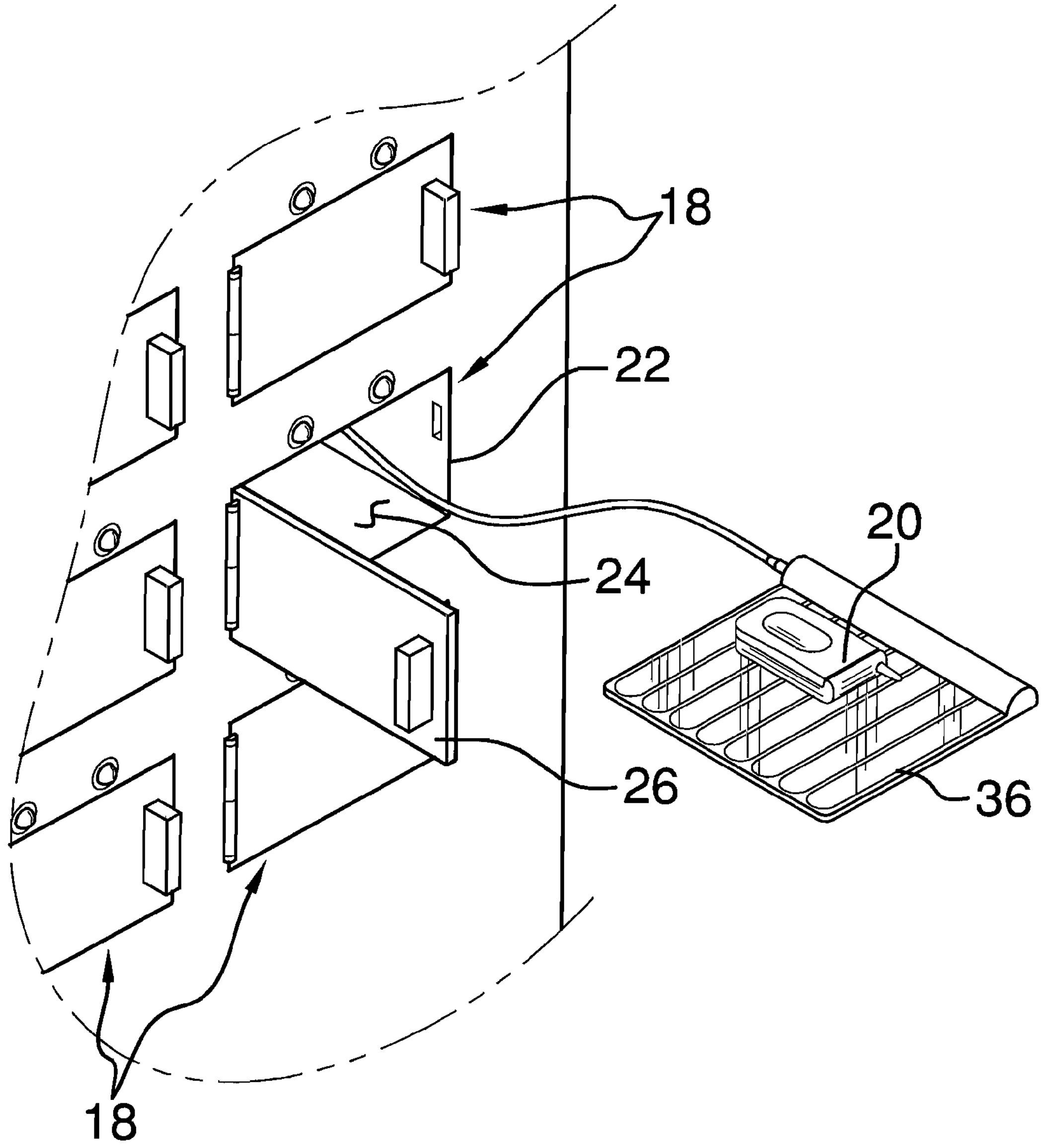
FIG. 3 is a broken front perspective view of an embodiment of the disclosure.
Figure 4:
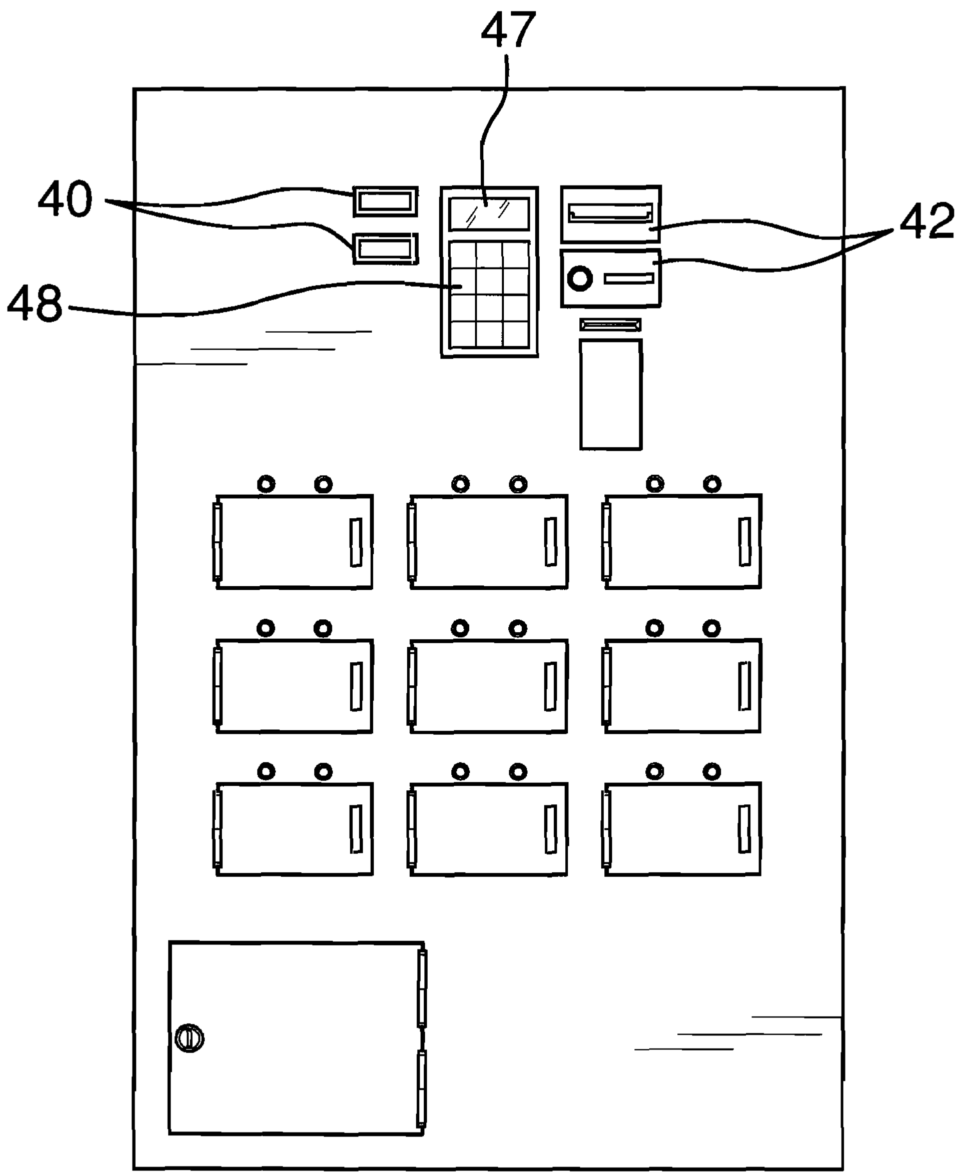
FIG. 4 is a front view of an embodiment of the disclosure.
Figure 5:
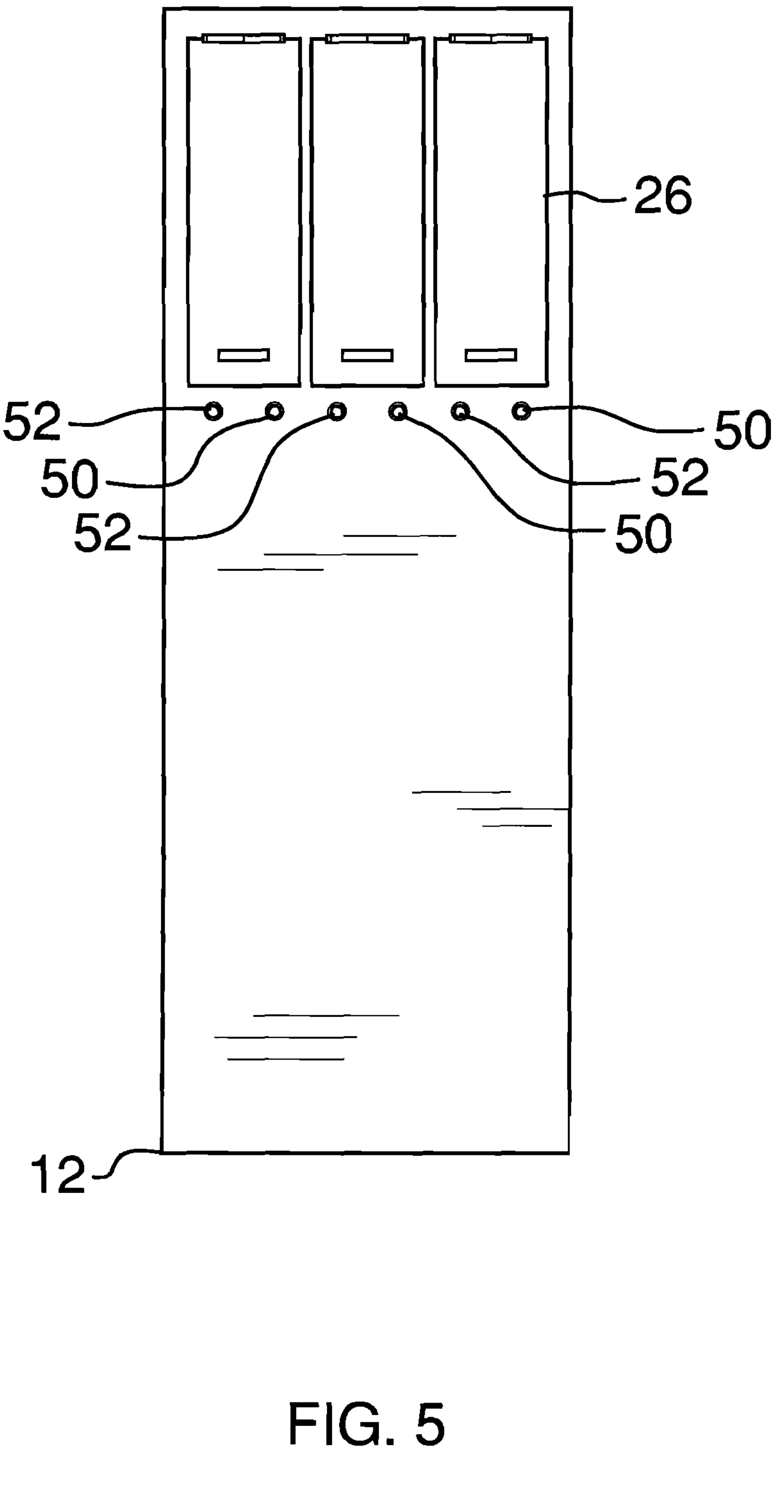
FIG. 5 is a side view of an embodiment of the disclosure.

With reference now to the drawings, and in particular to FIGS. 1 through 7 thereof, a new electrical device charger embodying the principles and concepts of an embodiment of the disclosure and generally designated by the reference numeral 10 will be described.

As best illustrated in FIGS. 1 through 7, the electrical device recharging kiosk assembly 10 generally comprises a housing 12 that has a top wall 14, a bottom wall 16 and a perimeter wall 17 attached to and extending between the top 14 and bottom 16 walls. The housing 12 has a plurality of storage spaces 18 therein each configured to hold an electronic device 20. The storage spaces 18 may come in varying sizes such that some may be used for holding mobile phones and electronic music players while others may have a size configured better to hold laptops, electronic tables, potable game players, portable video disc players and the like.

Each of the storage spaces 18 includes an opening 22 extending through the perimeter wall 17. A compartment 24 is mounted within the housing 12 and is aligned with and accessible through the opening 22. A door 26 is mounted on the perimeter wall 17 and is positioned in a closed position covering the opening 22 or in an open position exposing the opening 22. A lock 28 is engageable with the door 26 and is configured to lock the door 26 in the closed position. A light emitter 30 is mounted within the compartment 24 and a handle 32 is attached to the door 26 to facilitate the opening of the door 26.

Figure 6:
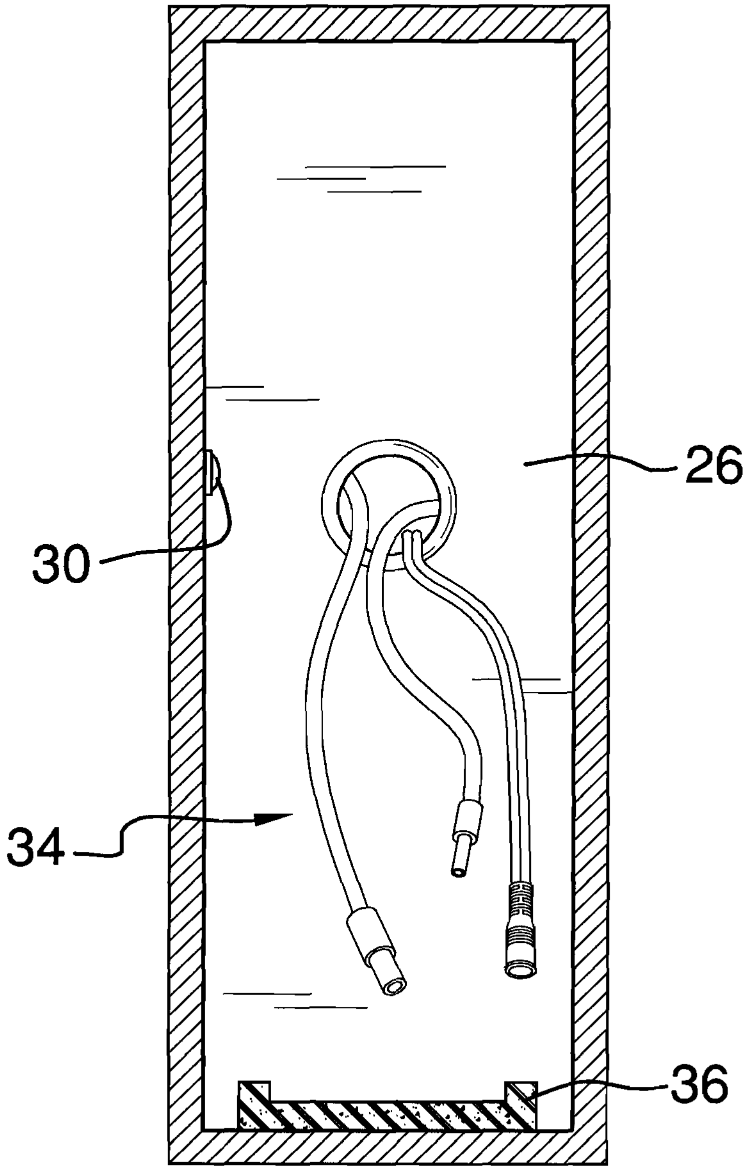
FIG. 6 is a cross-sectional view of an embodiment of the disclosure taken along line 6-6 of FIG. 1.
Figure 7:
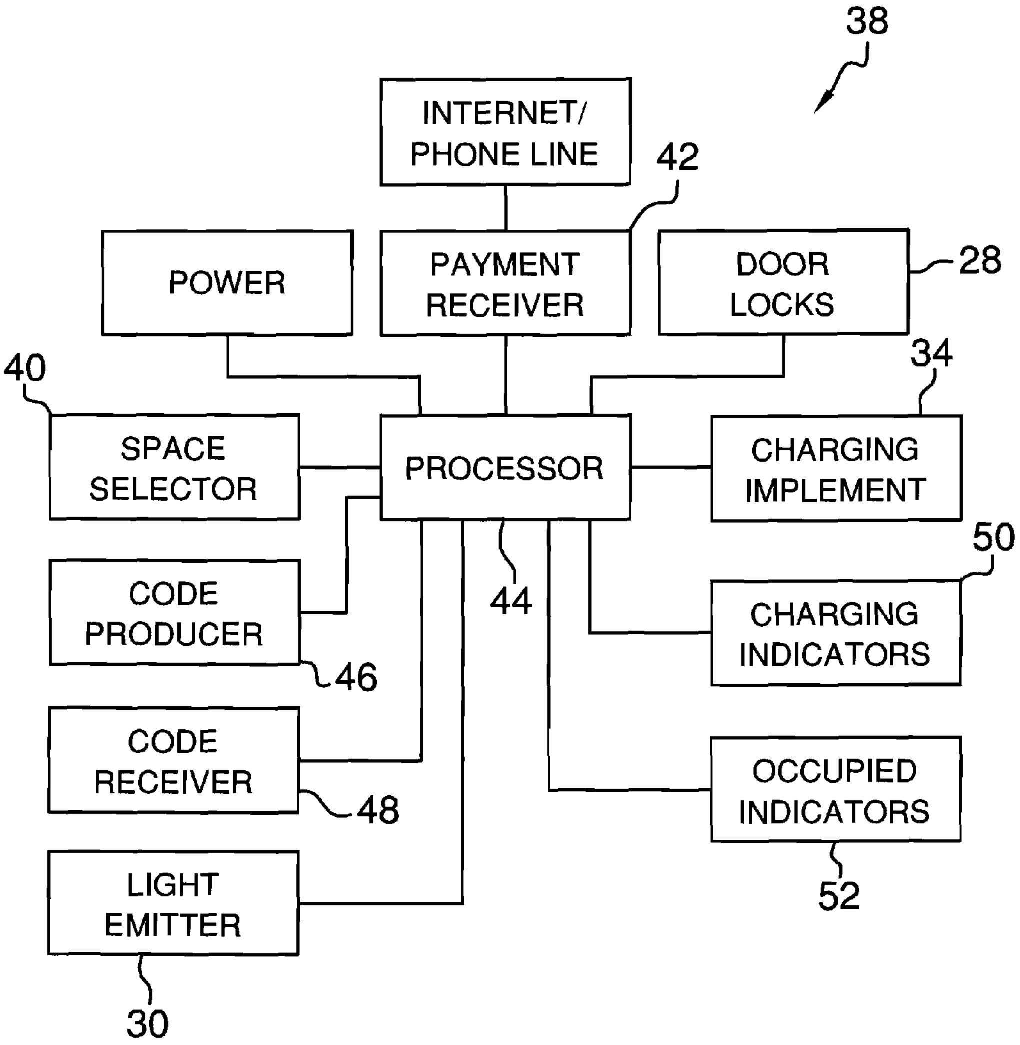
FIG. 7 is a schematic view of an embodiment of the disclosure.

Each of the storage spaces 18 further includes a charging implement 34 configured to recharge a battery of the electronic device. As can be seen in FIG. 6, a plurality of charging implements 34 may be found within each compartment to ensure that all types of devices may be accommodated. This may include a plurality of power cords each including a different connector and may further include what is conventionally known as a charging pad which utilizes, for instance, inductive charging by way of a magnetic field to avoid the use of cords. Mats 36 may be positioned in the compartments 26 for cushioning purposes.

A control 38 is mounted on the housing 12 and is electrically coupled to the lock 28 of each of the storage spaces 18. The control 38 unlocks a door 26 of one of the storage spaces 18 to allow access to a selected one of the storage spaces 18. The control 38 includes a selector 40 configured to allow a person to select the selected one of the storage spaces 18. For clarity, the selected one of the storage spaces will be defined as a “selected storage space.” The user is allowed select the storage space 18 required depending on the size of the electronic device 20. A payment receiving device 42 configured to allow a person to input payment into the control. The payment receiving device 42 may be any conventional payment receiving apparatus such one which accepts paper money and coins, as well as electronic transfers of funds by way of credit cards, debit cards and the like.

The control 38 further includes a processor 44 that is electrically coupled to the payment receiving device 42 and to the selector 40. The processor 44 is programmed to open the lock 28 to the selected storage space 18 when payment is received. The processor 44 is electrically coupled to the charging implements 34 in each of the storage spaces 18. The processor 44 may be configured to provide an amount of electricity to the charging implement 34 in the selected storage space 18 corresponding to an amount of payment input into the control 38. In this manner, the person may select the amount of money they wish to spend on charging their electronic device 20, or the processor 44 may be programmed to charge the electronic device 20 for a selected amount of time according to the payment level. However, since the amount of electricity to be used will typically be relatively modest, a fixed fee may be utilized where the device 20 is charged for pre-determined amount of time. The processor 44 may also be configured so that the door 26 of the selected storage space 18 is locked when closed and the charging implement 34 is charging the electronic device 20 to retain the electronic device 20 in a secured condition. This would generally be a preferred advantage to allow the owner of the electronic device 20 to safely leave the electronic device 20 charging while they pursue other activities such as eating, dining or sleeping.

The control 38 may further include a code producer 46 that is electrically coupled to the processor 44. The code producer 46 produces a code to be entered to unlock the door 26 of the selected storage space 18. The code producer 46 may include a display for displaying the code and/or a printer for printing the code onto and which may be part of a receipt printer. A code receiver 48 is electrically coupled to the processor 44 and may be electrically coupled to the display 47 to show a code being received. The processor 44 unlocks the door 26 of the selected storage space 18 when the code produced by the code producer 46 is entered into the code receiver 48. This ensures that others cannot retrieve a person's electronic device 20. An override code or remote access may be provided an owner of the assembly 10 in the event that the code is misplaced or forgotten.

A plurality of charging indicators 50 may be provided. Each of the storage spaces 18 has one of the charging indicators 50 positioned adjacent thereto. The charging indicators 50 indicate when an electronic device 20 is being charged in an adjacent one of the storage spaces 18. This will allow a person, who is charging an electronic device 20 for selected period or selected charge level, to know when their device 20 is no longer being charged and should be removed from the storage space 18. Additionally, a plurality of occupied indicators 52 may also be included. Each of the storage spaces 18 has one of the occupied indicators 52 positioned adjacent thereto. The occupied indicators 52 indicate when an electronic device 20 is positioned within an adjacent one of the storage spaces 18 to provide notice to others if there are any available spaces. The charging 50 and the occupied 52 indicators each may comprise light emitters. It should also be understood that these light emitters may be configured to be on or off to indicate charging is complete and on or off to indicate that the storage space 18 is being occupied.

In use, the assembly 10 is used as described above to provide easy and convenient means for a person to charge their electronic device 20, particularly in a public setting such as a movie theater, airport, shopping mall or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A portable electronic device recharging kiosk assembly, said assembly comprising:

a housing having a top wall, a bottom wall and a perimeter wall being attached to and extending between said top and bottom walls, said housing having a plurality of storage spaces therein each configured to hold an electronic device, each of said storage spaces including;

an opening extending through said perimeter wall;

a compartment being mounted within said housing and being aligned with and accessible through said opening;

a door being mounted on said perimeter wall, said door being positioned in a closed position covering said opening or in an open position exposing said opening;

a lock being engageable with said door and configured to lock said door in said closed position;

a charging implement configured to recharge a battery of the electronic device;

a control being mounted on said housing and being electrically coupled to said lock of each of said storage spaces, said control unlocking a door of one of said storage spaces to allow access to a selected one of the storage spaces and to said charging implement positioned therein;

a payment receiving device configured to allow a person to input payment into said control; and a processor being electrically coupled to said payment receiving device and to said selector, said processor being programmed to open said lock to said selected storage spaces when said payment is received, said processor being electrically coupled to said charging implement in each of said storage spaces, said processor being configured to provide an amount of electricity to said charging implement in said selected storage space corresponding to an amount of payment input into said control.

2. The assembly according to claim 1, wherein said control further includes:

a selector configured to allow a person to select the selected one of said storage spaces to define a selected storage space; and said processor being electrically coupled to said selector, said processor being programmed to open said lock to said selected storage spaces when said payment is received.

3. The assembly according to claim 2, wherein said door of said selected storage space is locked when closed and said charging implement is charging the electronic device to retain the electronic device in a secured condition.

4. The assembly according to claim 3, wherein said control further includes:

a code producer being electrically coupled to said processor, said code producer producing a code to be entered to unlock said door of said selected storage space; and a code receiver being electrically coupled to said processor, said processor unlocking said door of said selected storage space when the code produced by said code producer is entered into said code receiver.

5. The assembly according to claim 1, wherein said control further includes a plurality of charging indicators, each of said storage spaces having one of said charging indicators positioned adjacent thereto, said charging indicators indicating when an electronic device is being charged in an adjacent one of said storage spaces.

6. The assembly according to claim 1, wherein said control further includes a plurality of occupied indicators, each of said storage spaces having one of said occupied indicators positioned adjacent to thereto, said occupied indicators indicating when an electronic device is positioned within an adjacent one of said storage spaces.

7. A portable electronic device recharging kiosk assembly, said assembly comprising:

a housing having a top wall, a bottom wall and a perimeter wall being attached to and extending between said top and bottom walls, said housing having a plurality of storage spaces therein each configured to hold an electronic device, each of said storage spaces including;

an opening extending through said perimeter wall;

a compartment being mounted within said housing and being aligned with and accessible through said opening;

a door being mounted on said perimeter wall, said door being positioned in a closed position covering said opening or in an open position exposing said opening;

a lock being engageable with said door and configured to lock said door in said closed position;

a charging implement configured to recharge a battery of the electronic device;

a light emitter being mounted within said compartment;

a handle being attached to said door;

a control being mounted on said housing and being electrically coupled to said lock of each of said storage spaces, said control unlocking a door of one of said storage spaces to allow access to a selected one of the storage spaces, said control including;

a selector configured to allow a person to select the selected one of said storage spaces to define a selected storage space;

a payment receiving device configured to allow a person to input payment into said control;

a processor being electrically coupled to said payment receiving device and to said selector, said processor being programmed to open said lock to said selected storage spaces when payment is received, said processor being electrically coupled to said charging implement in each of said storage spaces, said processor being configured to provide an amount of electricity to said charging implement in said selected storage space corresponding to an amount of payment input into said control;

said door of said selected storage space being locked when closed and said charging implement is charging the electronic device to retain the electronic device in a secured condition;

a code producer being electrically coupled to said processor, said code producer producing a code to be entered to unlock said door of said selected storage space;

a code receiver being electrically coupled to said processor, said processor unlocking said door of said selected storage space when the code produced by said code producer is entered into said code receiver;

a plurality of charging indicators, each of said storage spaces having one of said charging indicators positioned adjacent thereto, said charging indicators indicating when an electronic device is being charged in an adjacent one of said storage spaces; and a plurality of occupied indicators, each of said storage spaces having one of said occupied indicators positioned adjacent to thereto, said occupied indicators indicating when an electronic device is positioned within an adjacent one of said storage spaces.

8. A portable electronic device recharging kiosk assembly, said assembly comprising:

a housing having a top wall, a bottom wall and a perimeter wall being attached to and extending between said top and bottom walls, said housing having a plurality of storage spaces therein each configured to hold an electronic device, each of said storage spaces including:

an opening extending through said perimeter wall;

a compartment being mounted within the housing and being aligned with and accessible through said opening;

a door being mounted on said perimeter wall, said door being positioned in a closed position covering said opening or in an open position exposing said opening;

a lock being engageable with said door and configured to lock said door in said closed position;

a charging implement configured to recharge a battery of the electronic device; and a control being mounted on said housing and being electrically coupled to said lock of each of said storage spaces, said control unlocking a door of one of the storage spaces to allow access to a selected one of the storage spaces and to said charging implement positioned therein, said control being configured to provide an amount of electricity to said charging implement in selected storage space corresponding to an amount of a payment input into said control, said control further includes a plurality of occupied indicators, each of said storage spaces having one of said occupied indicators positioned adjacent to thereto, said occupied indicators indicating when an electronic device is positioned within an adjacent one of said storage spaces.

9. The assembly according to claim 8, wherein said control further includes:

a selector configured to allow a person to select the selected one of said storage spaces to define a selected storage space; and said door of said selected storage space is locked when closed and said charging implement is charging the electronic device to retain the electronic device in a secured condition.

* * * * *